Feb. 12, 1963

P. C. BOWSER ETAL 3,077,028

METHOD FOR STABILIZING COMPOSITE ROTOR STRUCTURES
AND APPARATUS FOR PRACTICING THE SAME

Filed Dec. 28, 1953

INVENTOR
Phillip C. Bowser &
BY Kauno E. Sihvonen

ATTORNEY

INVENTORS
Phillip C. Bowser &
BY Kauno E. Sihvonen
Paul Fitzpatrick
ATTORNEY

INVENTORS
Phillip C. Bowser &
BY Kauno E. Sihvonen
Paul Fitzpatrick
ATTORNEY

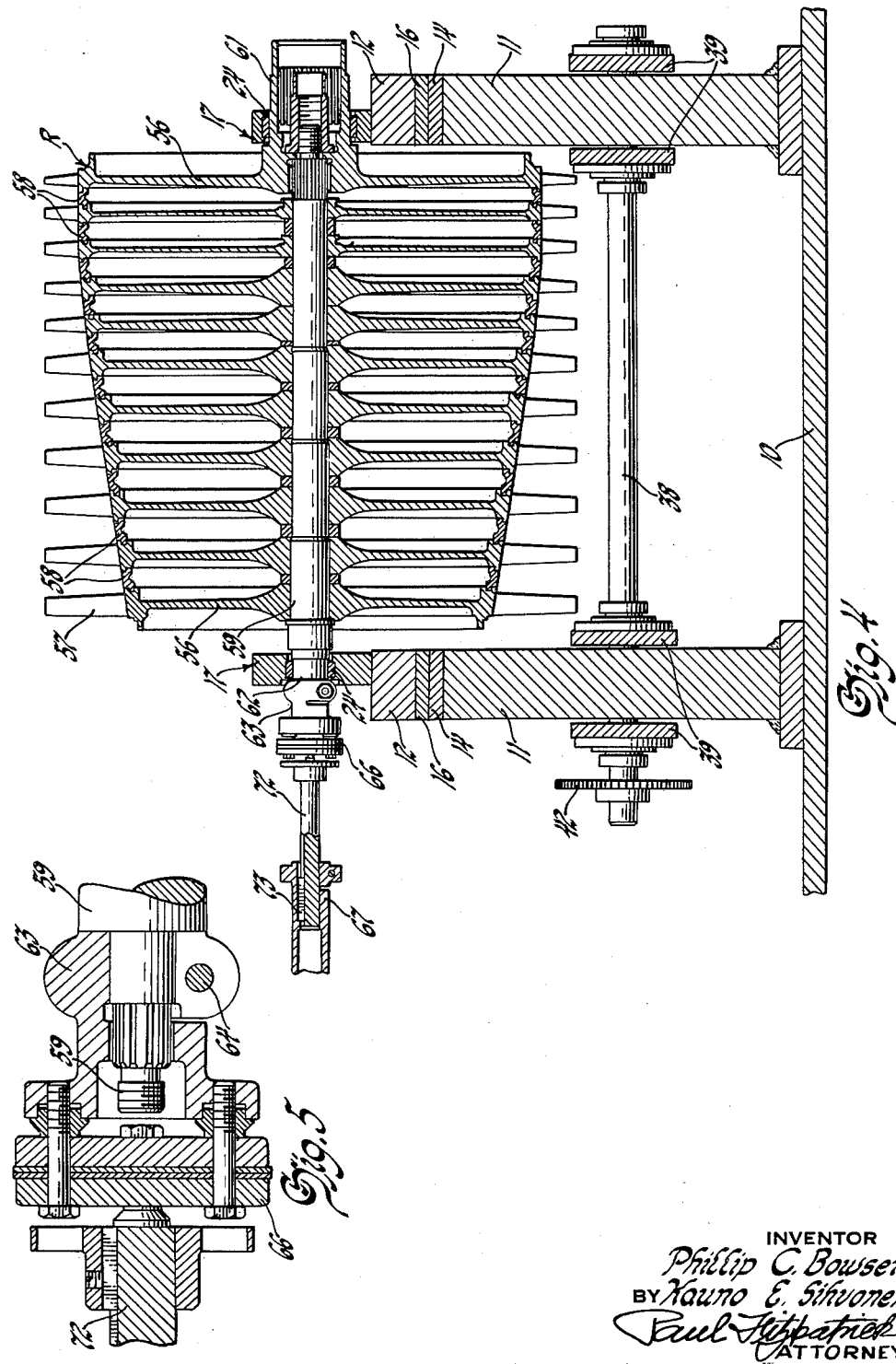

3,077,028
METHOD FOR STABILIZING COMPOSITE ROTOR STRUCTURES AND APPARATUS FOR PRACTICING THE SAME
Phillip C. Bowser, Roseville, and Kauno E. Sihvonen, Detroit, Mich., assignors to General Motors Corporation, Detroit, Mich., a corporation of Delaware
Filed Dec. 28, 1953, Ser. No. 400,644
8 Claims. (Cl. 29—156.8)

Our invention relates to a method and apparatus for stabilizing composite structures. Although the invention undoubtedly has various fields of application, it was conceived and developed in response to the problem presented by vibration of composite rotors of axial flow compressors of gas turbine engines. An example of a rotor of the sort to which reference is made is the subject of U.S. Patent No. 2,548,886. This is a rotor composed of a plurality of disks, spacing rings engaging the rims of the disks, and a tie bolt extending through the center of the disks and tending to hold the rims in engagement. The disks and spacer rings are assembled frictionally. Experience has shown that rotors of this sort, even though very carefully balanced, have shown excessive vibration in service due to a change in dimensions resulting from a settling or shifting of the parts in service. The theory upon which the invention was developed is that loss of balance could be prevented if the rotors were throughly stabilized, that is, allowed to assume the relative position of the parts in which the rotor is most stable, before final balancing and installation in the engine.

The method of the invention involves jarring or shocking the rotor transversely to its axis repeatedly and periodically. The shocks are relatively strong at first and are gradually decreased in strength or severity to a very low or zero value as the operation proceeds. The direction of the shock, that is, its orientation around the axis, varies so that successive shocks come from different directions and a consecutive series of shocks in considerable number will provide shocks coming from all directions around the rotor. This orientation may be obtained very simply by rotating the rotor a little more or less than one-half turn between shocks or by an other nearly integral relation between the period of rotation and the period between shocks.

In order to stabilize rotors quickly, systematically, and effectively according to the method of the invention, we have devised a machine which, while simple in construction, is particularly suited to effect the desired operations with a minimum of attention and to insure standardized treatment of the rotors being stabilized according to a desired schedule.

The principal objects of the invention are to improve the characteristics of rotating machinery, to stabilize composite structures, particularly high speed rotary structures, to improve the balance of such structures, and to provide apparatus by which these results may be most accurately, quickly, and easily obtained.

The significance of the invention, the principles thereof, and various advantages thereof will be more clearly apparent from the succeeding detailed description of the preferred embodiment of the invention and the accompanying drawings, in which:

FIG. 4 is a sectional view taken on the vertical plane indicated at 4—4 in FIG. 1, and FIG. 5 is a detail of a flexible coupling by which the rotor is driven, the view being taken in section on a plane containing the axis of the shaft.

Figure 1:
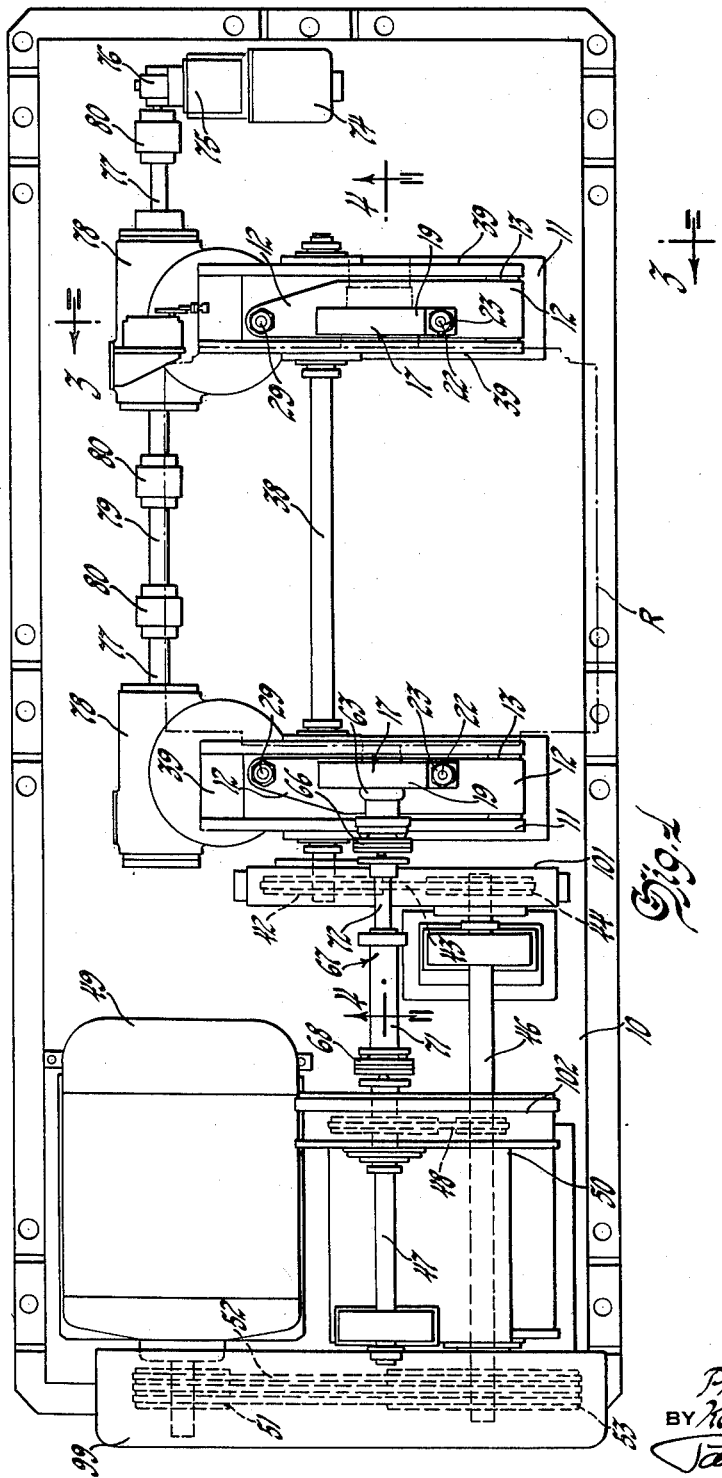
FIG. 1 is a plan view of a rotor stabilizing machine according to the invention.
Figure 2:
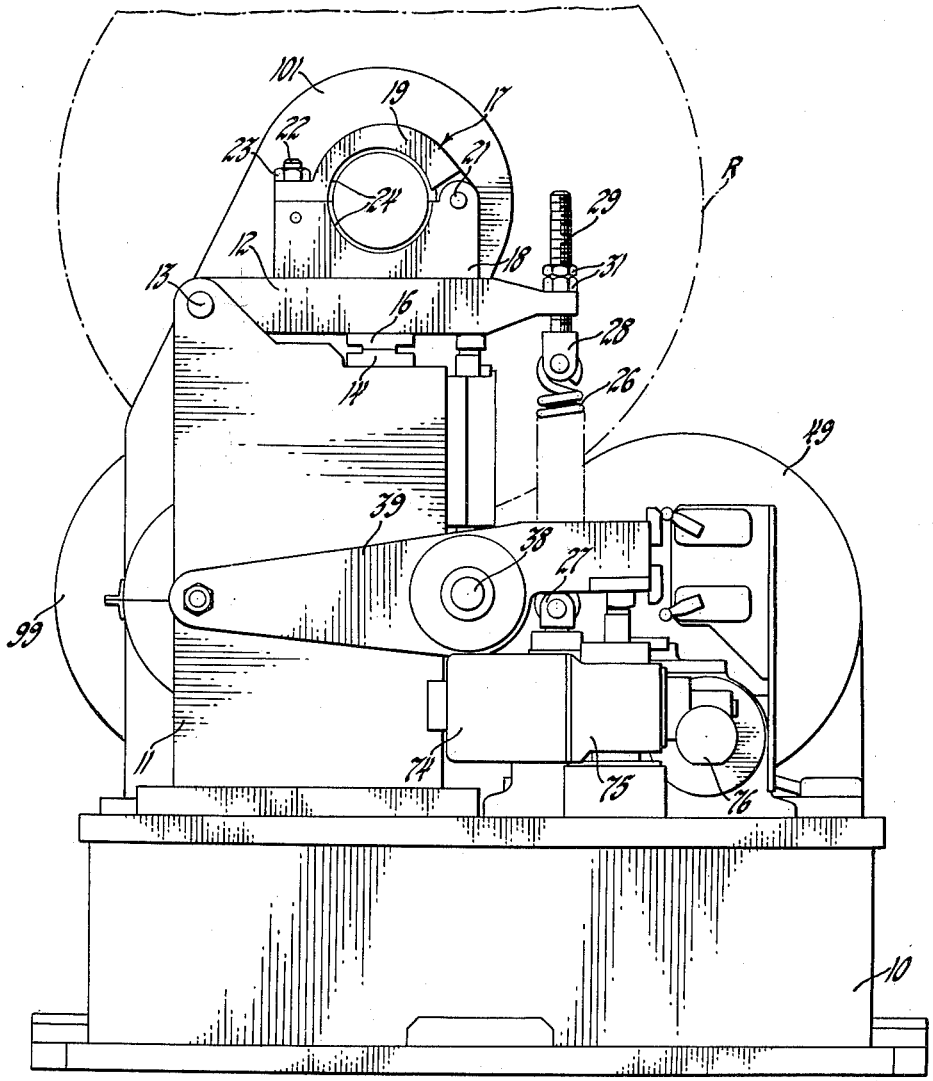
FIG. 2 is an end elevation of the same.

Referring first to FIGS. 1 and 2, the stabilizing machine comprises a generally rectangular base 10 on which the other parts of the machine are mounted and two massive spaced uprights or stanchions 11. A rocker bar 12 is supported in a clevis in the top of each upright by a journal pin 13. Each rocker bar is normally supported by an anvil 14 on the upright 11 which is engaged by a hammer 16 on the underside of the rocker bar. Atop each rocker bar 12 is a pillow block assembly 17 which is conveniently in the form of a split bearing with the two parts hinged so that the rotor shaft may be readily mounted in the bearings. Thus, each pillow block 17 comprises a base 18, a cap 19 hinged thereon by pin 21, a swing stud 22 passing through a fork in the free end of the cap, and a nut 23 to hold the cap down. A friction bushing 24 the two halves of which are secured in the base and cap respectively serve to journal the rotor R as illustrated in FIG. 4. The hammer 16 is urged against the anvil 14 by the weight of the bar 12, the pillow block 17, and the rotor R. Additionally, the rotor is preferably urged against the anvil 14 by a spring 26 connected to each rocker bar 12 to increase the severity of the shock when it is dropped or pulled against the anvil. Each spring 26 is a tension spring connected between a conventional anchorage 27 fixed to the base and a fitting 28 having a threaded shank 29 passing through the free end of the rocker bar 12 and adjustably fixed thereto by nuts 31 so that the pull of the spring may be varied as desired.

Each of the rocker bars 12 is periodically lifted and dropped against the anvil 14 by the following mechanism: A tappet 32 mounted for vertical reciprocation in a guide 33 on the upright engages a block 34 fixed to the underside of the rocker bar. The lower end of the tappet constitutes a cam follower 36 which is actuated by a spiral cam 37, the cams 37 being fixed on a camshaft 38 journaled in swingable camshaft support arms 39. Each arm 39, as will be most clearly apparent from FIG. 1, is U-shaped and comprises two side arms extending across each face of the upright 11 and supported by a pivot stud 41 or the like. The camshaft 38 is journaled in conventional manner in the swing arms 39 and has mounted on one end thereof a drive sprocket 42. This sprocket 42 is driven through a chain 43 by sprocket 44 on a main shaft 46 suitably journaled in a supporting frame 50 on the base 10. The shaft 46 also drives a rotor drive shaft 47 through a sprocket chain drive 48. This shaft is mounted in the support 50 and coupled to the rotor by means to be described. The main shaft 46 is driven by a motor 49 through multiple V-belt pulley 51, belts 52, and pulley 53. As will be seen, therefore, the camshaft 38 is driven in timed relation to the rotor drive shaft 48 and since the latter turns at the same rate as the rotor, a proper selection of sprocket ratios causes the camshaft to make one revolution for the desired degree of angular rotation of the rotor. Preferably, the camshaft rotates slightly more or less than twice as fast as the rotor so that successive shocks to the rotor are almost opposed and the orientation of the shocks gradually moves around the rotor as the shakedown operation proceeds.

The details of the rotor are, of course, immaterial to the invention but it may be pointed out that the rotor R illustrated in FIG. 4 comprises a number of disks 56 mounting the compressor blades 57 and separated at the rims by rings 58. The parts are held together by a central tie bolt 59 which engages the first and last wheels. The last wheel 56 is integral with a hub 61 which forms one journal of the rotor as mounted in the apparatus, and the forward end of the tie bolt projects to provide a second journal 62. One type of rotor which may be stabilized by the apparatus and method of the invention is shown in Patent No. 2,548,886, to which reference may be made for additional details. The journal portions 61 and 62 of the rotor are mounted in the split journals 24 of the pillow blocks 17 and the end of the tie bolt is clamped in a chuck 63 which is shown most clearly in FIG. 5 as a split socket tightened by a tangent bolt 64. The driving chuck 63 is coupled through a flexible shaft coupling 66, an extensible shaft 67, and a second flexible coupling 68 to the rotor drive shaft 48. The flexible couplings are provided because the rotor is being lifted and dropped as it is rotated, and the extensible shaft facilitates coupling to the rotor. The couplings 66 and 68 as illustrated are of a standard commercial type and need not be described in detail. The extensible shaft comprises a hollow shaft section 71, a shaft section 72 slidable therein, and a spline or key 73 to prevent relative rotation of the two sections.

Figure 3:
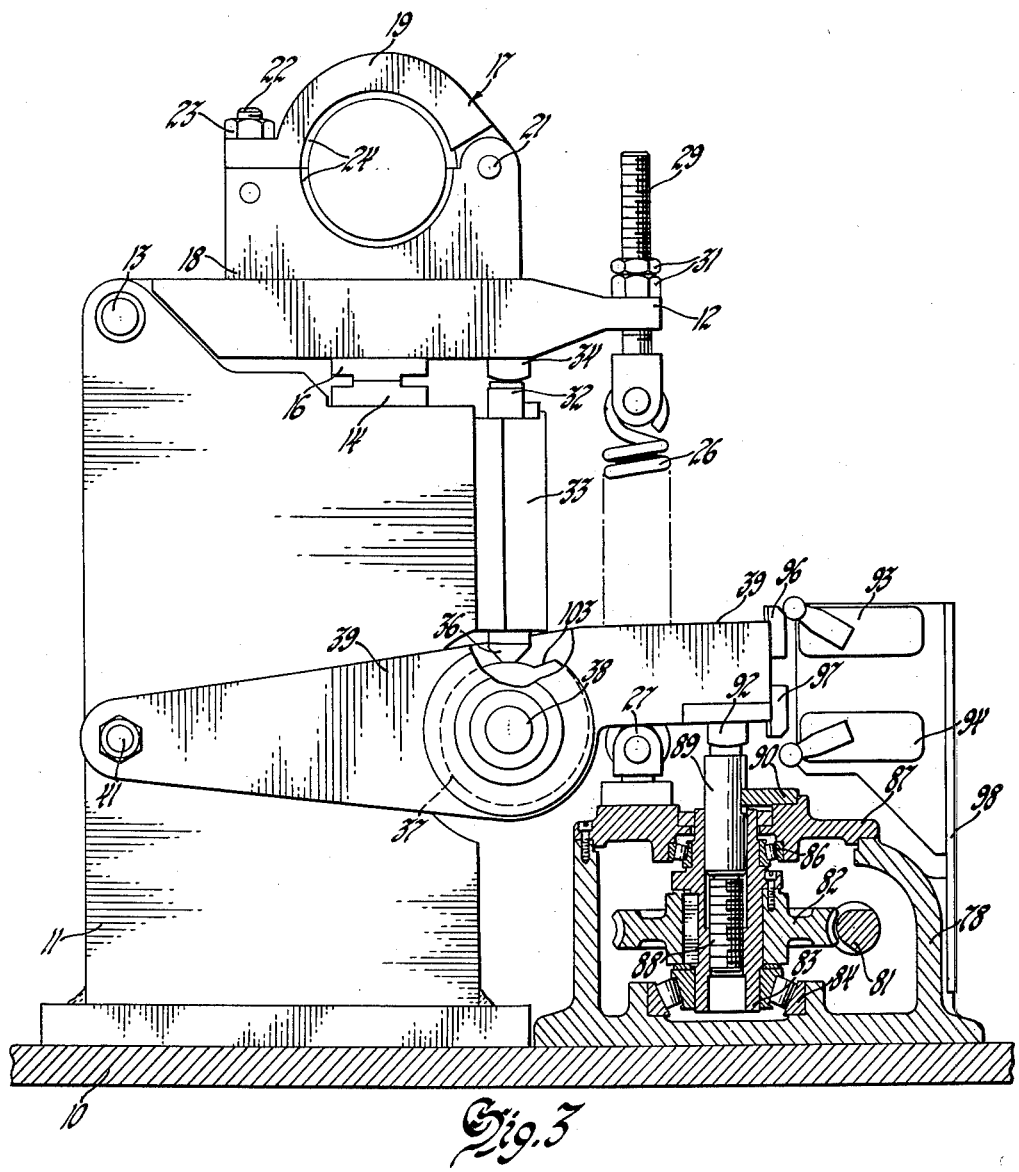
FIG. 3 is a partial view corresponding to FIG. 2 but with parts cut away on the plane indicated at 3—3 in FIG. 1.

In order to vary the amplitude of the drop of the rotor and, therefore, the magnitude of the shock, the camshaft supports 39 are raised and lowered concurrently so as to vary the effective lift of the cams 37. This adjustment is effected by a reversible motor 74 with a variable reduction gear 75 mounted on the base 10 and coupled through a right angle gearing 76 to a worm shaft 77 journaled in a housing 78 also mounted on the base. The shaft 77 is coupled through intermediate shaft 79 and flexible couplings 80 to a second worm shaft 77 mounted in a second housing 78. Worms 81 (FIG. 3) on the shafts 77 cooperate with worm wheels 82 mounted on hollow shafts 83 journaled by bearings 84 and 86 in the base of the housing 78 and in its cover 87 respectively. The shaft 83 is internally threaded and has threaded therein the threaded end 88 of a non-rotating lifter 89. The lifter 89 is engaged by a key 90 fixed to the cover 87 of the housing so that it cannot rotate but may move vertically. The upper end of the lifter 89 engages a block 92 at the end of the camshaft support 39 so that the operation of motor 74 gradually raises or lowers the camshaft 38.

The travel of the camshaft supports 39 may be controlled by commercial limit switches 93 and 94 connected in the energizing circuit of motor 74 and actuated by blocks 96 and 97 on the end of one of the arms 39. These blocks may be adjustable vertically by any conventional means. The limit switches are mounted on the support 98 on the base 10.

The belt drive 51, 52, and 53 may be enclosed in a cover 99 and the chain drives 43 and 48 in protective covers 101 and 102, respectively. The base 10 may contain a lubricant circulating pump, if desired. A lubricating system for the machine is not described, as it may be conventional and the details are immaterial to an understanding of the invention.

The mode of operation of the machine may vary to some extent, but, by way of illustration, the following stabilizing procedure which has been used will be described. The rotor R is mounted in the pillow blocks 17 and the chuck 63 is tightened on the end of the tie bolt 59. The camshaft is initially elevated to lift and drop the rotor a quarter of an inch. The drive is such that the rotor turns 248 revolutions per minute and the dropping or jarring frequency is 500 times per minute. The rate of adjustment of the cam lift is such that the lift gradually decreases to zero over a period of eight minutes. As will be apparent, when the cam lift becomes zero, no further jarring is effected and the limit switch 94 may be set to cut out the motor 74 when the lift becomes zero. At the end of this cycle the motor 49 may be stopped, stopping the rotor and cam shaft and the motor 74 may be energized to raise the camshaft in preparation for operation on the next rotor with the limit switch 93 set to stop motor 74 when the camshaft is in the desired position. The cam-shaft thus may be reset during the unloading and reloading operation.

It may be added that the tension of the springs 26 in this case was set to about one thousand pounds per spring. It will be apparent that the springs make it unnecessary to use a high lift in order to secure adequate jarring force but could be dispensed with in certain cases. The cams 37, as will be apparent, gradually lift the rotor and suddenly drop it as the steep slope 103 of the cam goes under the tappet 36. The speed of motor 74 or the ratio of transmission 75 may be varied to control the duration of the stabilizing cycle.

It will be apparent that the method of the invention could be accomplished by machines other than that herein described or could be accomplished simply by manually lifting the rotor, dropping it against an anvil, and rotating it between jars, or by striking the shaft of the rotor while the rotor is stationary. However, the apparatus described provides for accurate control of the stabilizing operation and greatly facilitates the carrying out of the process. The method and apparatus has been used with composite rotors of different structures from that illustrated and has proved effective to eliminate frictionally maintained stresses in the structures.

The description herein, for purposes of exposition, of the preferred embodiment of the invention is not to be construed as limiting the invention as modifications may be made by exercise of skill in the art within the principles of the invention.

We claim:
1. A method of stabilizing a composite rotor having relatively shiftable parts comprising rotating the rotor about its axis at a first predetermined frequency, lifting the rotor, causing it to fall, and interrupting the fall suddenly, at a second predetermined frequency, and progressively diminishing the amplitude of the drops of the rotor, in which the ratio of the two said frequencies is nearly but not exactly a small integer.

2. A rotor stabilizing machine comprising, in combination, means for supporting a rotor, jarring means mounted adjacent to the rotor and movable relative to the rotor for engagement therewith to jar the rotor transversely to an axis of the rotor, and means connected to the rotor and the jarring means for traversing the direction of the jarring action around the axis.

3. A rotor stabilizing machine comprising, in combination, means for supporting a rotor, jarring means mounted adjacent to the rotor and movable relative to the rotor for engagement therewith to jar the rotor transversely to an axis of the rotor, means connected to the rotor and the jarring means for traversing the direction of the jarring action around the axis, and means connected to the parring means for progressively varying the intensity of the jarring.

4. A rotor stabilizing machine comprising, in combination, bearings for the rotor, means for rotating the rotor in the bearings, a fixed abutment mounted adjacent to and below the rotor, and means coupled to the rotating means for lifting the rotor periodically and dropping it suddenly against the abutment at a rate slightly different from a rate having a small integral ratio with the rate of rotation of the rotor.

5. A rotor stabilizing machine comprising, in combination, bearings for the rotor, means for rotating the rotor in the bearings, a fixed abutment mounted adjacent to and below the rotor, means coupled to the rotating means for lifting the rotor periodically and dropping it suddenly against the abutment at a rate slightly different from a rate having a small integral ratio with the rate of rotation of the rotor, and means for progressively varying the amplitude of motion of the lifting means.

6. A rotor stabilizing machine comprising, in combination, bearings for the rotor, means for rotating the rotor in the bearings, a fixed abutment mounted adjacent to and below one of the bearings, and means coupled to the rotating means for lifting the said one bearing periodically and dropping it suddenly against the abutment at a rate slightly different from a rate having a small integral ratio with the rate of rotation of the rotor.

7. A rotor stabilizing machine comprising, in combination, bearings for the rotor, means for rotating the rotor in the bearings, fixed abutments mounted adjacent to and below the bearings, means coupled to the rotating means for lifting the bearings periodically and dropping them suddenly against the abutments at a rate slightly different from a rate having a small integral ratio with the rate of rotation of the rotor, and means for progressively varying the amplitude of motion of the lifting means.

8. A rotor stabilizing machine comprising, in combination, bearings for the rotor, means for rotating the rotor in the bearings, fixed abutments mounted adjacent to and below the bearings, means coupled to the rotating means for lifting the bearings periodically and dropping them suddenly against the abutments at a rate slightly different from a rate having a small integral ratio with the rate of rotation of the rotor, means for progressively varying the amplitude of motion of the lifting means, and means actuated by the last-mentioned means for terminating a cycle of action of the machine.

References Cited in the file of this patent

UNITED STATES PATENTS

| Number | Name | Date |
|---|---|---|
| 1,193,686 | Heisler | Aug. 8, 1916 |
| 1,549,996 | Liebowitz | Aug. 18, 1925 |
| 1,553,936 | Feeney | Sept. 15, 1925 |
| 1,625,259 | Johnson | Apr. 19, 1927 |
| 1,731,922 | Eaton | Oct. 15, 1929 |
| 2,412,860 | Baudry | Dec. 17, 1946 |
| 2,438,756 | Larsen | Mar. 30, 1948 |
| 2,450,493 | Strub | Oct. 5, 1948 |
| 2,548,886 | Howard | Apr. 17, 1951 |
| 2,637,521 | Constantine | May 5, 1953 |
| 2,656,710 | Weaver | Oct. 27, 1953 |
| 2,663,184 | Merrill | Dec. 22, 1953 |